(12) United States Patent
Mykulowycz et al.

(10) Patent No.: US 12,502,731 B2
(45) Date of Patent: Dec. 23, 2025

(54) SUPPORT STRUCTURES FOR LAMINATED METALLIC PARTS

(71) Applicant: ALLOY ENTERPRISES, INC., Somerville, MA (US)

(72) Inventors: Nicholas Mykulowycz, Boxford, MA (US); Alison Forsyth, Somerville, MA (US)

(73) Assignee: Alloy Enterprises Inc., Burlington, MA (US)

( * ) Notice: Subject to any disclaimer, the term of this patent is extended or adjusted under 35 U.S.C. 154(b) by 0 days.

(21) Appl. No.: 17/997,553

(22) PCT Filed: May 5, 2021

(86) PCT No.: PCT/US2021/030879
§ 371 (c)(1),
(2) Date: Oct. 30, 2022

(87) PCT Pub. No.: WO2021/226230
PCT Pub. Date: Nov. 11, 2021

(65) Prior Publication Data
US 2023/0166356 A1    Jun. 1, 2023

Related U.S. Application Data

(60) Provisional application No. 63/020,070, filed on May 5, 2020.

(51) Int. Cl.
*B23K 26/211* (2014.01)
*B22F 10/40* (2021.01)
(Continued)

(52) U.S. Cl.
CPC ............ *B23K 26/211* (2015.10); *B22F 10/40* (2021.01); *B29C 64/147* (2017.08); *B33Y 10/00* (2014.12);
(Continued)

(58) Field of Classification Search
CPC ....... B29C 64/147; B29C 64/40; B22F 10/40; B23P 2700/12
See application file for complete search history.

(56) References Cited

U.S. PATENT DOCUMENTS 2,759,246 A * 8/1956 Campbell ................. F28F 1/02
228/183
2,766,514 A * 10/1956 Adams .................... B21C 37/14
428/595
(Continued)

FOREIGN PATENT DOCUMENTS

| EP | 0775550 B1 * | 2/2001 | ............ B23P 15/246 |
| JP | 6587028 B1 * | 10/2019 | ............ B23P 23/04 |
| KR | 20020030319 A * | 4/2002 | ............ B29C 65/00 |

OTHER PUBLICATIONS

KR20020030319A translation (Year: 2002).*
(Continued)

*Primary Examiner* — Michael W Hotchkiss
(74) *Attorney, Agent, or Firm* — Danielson Legal LLC

(57) ABSTRACT

A method for the additive manufacturing of an object and a system for manufacturing an object. The method includes depositing a first foil layer, the first foil layer including a first body section, a first support section connected to the first body section, and a second support section connected to the first body section; depositing a second foil layer, the second foil layer comprising a second body section, a third support section, and a fourth support section; aligning the second foil layer and the first foil layer; and applying at least one of heat and pressure to the first foil layer and the second foil layer to form the object comprising the first body section and the second body section.

44 Claims, 15 Drawing Sheets

(51) Int. Cl.
  *B23K 20/02*    (2006.01)
  *B29C 64/147*   (2017.01)
  *B29C 64/40*    (2017.01)
  *B33Y 10/00*    (2015.01)
  *B33Y 30/00*    (2015.01)
  *B33Y 40/20*    (2020.01)

(52) U.S. Cl.
  CPC ............. *B33Y 30/00* (2014.12); *B33Y 40/20* (2020.01); *B23K 20/02* (2013.01); *B23P 2700/12* (2013.01); *B29C 64/40* (2017.08)

(56) References Cited

U.S. PATENT DOCUMENTS

| | | | | |
|---|---|---|---|---|
| 4,752,352 | A * | 6/1988 | Feygin | B23K 26/08 29/430 |
| 5,126,529 | A | 6/1992 | Weiss | |
| 5,286,573 | A * | 2/1994 | Prinz | B22F 3/115 428/419 |
| 5,398,193 | A * | 3/1995 | deAngelis | B33Y 10/00 425/141 |
| 5,637,175 | A * | 6/1997 | Feygin | B29C 64/141 264/405 |
| 5,876,550 | A | 3/1999 | Feygin | |
| 6,324,438 | B1 * | 11/2001 | Cormier | C08J 5/122 700/98 |
| 6,413,360 | B1 * | 7/2002 | Morita | B32B 38/10 156/583.1 |
| 6,519,500 | B1 * | 2/2003 | White | G05B 19/4099 700/182 |
| 6,589,471 | B1 * | 7/2003 | Khoshnevis | B29B 17/0404 264/308 |
| 6,814,823 | B1 * | 11/2004 | White | B33Y 40/00 700/123 |
| 9,550,349 | B1 * | 1/2017 | Larsen | F28F 3/02 |
| 10,377,082 | B2 | 8/2019 | Mark | |
| 2005/0161146 | A1 * | 7/2005 | Graf | B22F 10/36 156/89.12 |
| 2007/0181259 | A1 * | 8/2007 | Bar-Erez | B29C 64/147 156/578 |
| 2009/0039570 | A1 * | 2/2009 | Clark | B29C 64/153 264/653 |
| 2009/0261067 | A1 * | 10/2009 | Dietrich | B26F 3/004 216/83 |
| 2014/0271961 | A1 * | 9/2014 | Khoshnevis | B28B 1/001 425/375 |
| 2014/0300017 | A1 * | 10/2014 | Wighton | B29C 64/118 425/150 |
| 2015/0083369 | A1 | 3/2015 | Fryer et al. | |
| 2015/0136318 | A1 * | 5/2015 | Tiefel | B29C 66/342 156/272.8 |
| 2015/0251351 | A1 * | 9/2015 | Feygin | B29C 64/141 156/267 |
| 2016/0009069 | A1 | 1/2016 | Mou et al. | |
| 2016/0144568 | A1 * | 5/2016 | MacCormack | B29C 64/112 156/367 |
| 2017/0014954 | A1 * | 1/2017 | Pomerantz | B33Y 70/00 |
| 2017/0087816 | A1 * | 3/2017 | Larsen | B23P 17/00 |
| 2017/0297098 | A1 * | 10/2017 | Myerberg | B22F 3/22 |
| 2017/0297104 | A1 * | 10/2017 | Gibson | B22F 7/02 |
| 2018/0162062 | A1 | 6/2018 | Mark | |
| 2018/0229332 | A1 * | 8/2018 | Tsai | B23K 26/082 |
| 2018/0311732 | A1 * | 11/2018 | El Naga | B23K 26/342 |
| 2019/0015923 | A1 * | 1/2019 | O'Neill | B33Y 70/00 |
| 2019/0126538 | A1 * | 5/2019 | Fujita | B29C 64/218 |
| 2019/0160735 | A1 * | 5/2019 | Prakash | B33Y 10/00 |
| 2019/0344381 | A1 * | 11/2019 | Pomerantz | B29C 64/223 |
| 2019/0344498 | A1 * | 11/2019 | Klimczak | B29C 61/0616 |
| 2020/0009795 | A1 * | 1/2020 | Gibson | B29C 64/40 |
| 2020/0223131 | A1 * | 7/2020 | Swartz | B29C 64/30 |
| 2020/0368813 | A1 * | 11/2020 | Mackie | B22F 12/50 |
| 2022/0048114 | A1 * | 2/2022 | Günster | B33Y 30/00 |

OTHER PUBLICATIONS

JP-6587028-B1 translation (Year: 2019).*
International Search Report for PCT/US2021/030879, Aug. 10, 2021, 2 pgs.
Written Opinion for PCT/US2021/030879, Aug. 10, 2021, 9 pgs.
1 Extended European search report for European Pat. Appl. No. 21800823.3, Nov. 16, 2023, 9 pages.
Office action for Israeli Pat. Appl. No. 297917, 4 pages, May 21, 2025.
Extended European search report for EP21821965.7, 10 pages, Nov. 8, 2024.
Replacement extended European search report for EP21821965.7, 18 pages, Feb, 24, 2025.

* cited by examiner

SUPPORT STRUCTURES FOR LAMINATED METALLIC PARTS

CROSS-REFERENCE TO RELATED APPLICATIONS

The present application is a national phase application of International (PCT) Patent Appl No PCT/US2021/030879, filed internationally on May 5, 2021, and claims the benefit of and priority to United States Provisional Appl. No. 63/020,070, filed on May 5, 2020, the entire disclosure of which is hereby incorporated by reference as if set forth in its entirety herein.

TECHNICAL FIELD

Embodiments described herein relate to methods and systems for fabricating an object and, more particularly but not exclusively, to methods and systems using additive manufacturing of foil layers with structural support to form an object.

BACKGROUND

Support structures ensure additively manufactured parts remain dimensionally accurate and repeatable during the manufacturing process. Typically, the support generation strategy is optimized for the specific additive manufacturing process. In traditional laminated object manufacturing ("LOM"), an adhesive is used to adhere sheets together. This is sufficient for plastic and paper laminated object manufacturing because plastic and paper parts typically are not subjected to high forces or loads.

Optimization for specific processes requires planning for individual additively manufactured parts. Conversely, implementing a comprehensive support strategy allows for more complex parts to be manufactured with fewer design rules.

In metal sintering processes, a support is created to prevent distortion of a part before sintering by supporting one end of the metal part during the heating process. In sintering, the metal part can be weak and easily distorted through friction and gravity. The sintering supports may need to be removed by hand to prevent further distortion and parts can still shrink by 15-20% while sintering. A support may counteract the force of gravity and shrink with the part. Friction within beds may also prevent uniform shrinkage in sintering. The support may also prevent even pressure or heat from being applied across the metal body part.

A need therefore exists for methods and systems to improve additive manufacturing processes.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for additive manufacturing of an object. In some embodiments, the method includes depositing a first foil layer, the first foil layer including a first object region and a first support region connected to the first object region; depositing a second foil layer, the second foil layer including a second object region and a second support region; and forming an object section including the first object region and the second object region.

In some embodiments, the first support region and the second support region are configured to evenly distribute at least one of temperature and pressure to the object section.

In some embodiments, the method further includes depositing an inhibitory material including carbon onto at least one of the first foil layer or the second foil layer.

In some embodiments, the method further includes depositing at least two additional foil layers between the first foil layer and the second foil layer.

In some embodiments, the second foil layer is spot welded onto the first foil layer.

In some embodiments, the method further includes attaching the second object region to the first object region, the attached second object region and the first object region forming the object section; and attaching the second support region to the first support region, the attached second support region and the first support region forming a support section.

In some embodiments, the first support section is subdivided to facilitate piecewise removal from the object section.

In some embodiments the method further includes a third support region connected to the first object region and a fourth support region connected to the second object region. In some embodiments the method further includes attaching the second object region to the first object region, the attached second object region and the first object region forming the object section; attaching the second support region to the first support region, the attached second support region and the first support region forming a first support section; and attaching the third support region to the fourth support region, the attached third support region and the fourth support region forming a second support section.

In some embodiments, the first support section and the second support section are configured to evenly distribute temperature and pressure to the object and through the first foil layer and the second foil layer.

In some embodiments, the first support section and the second support section are configured to prevent deformation of the object section after initial deposition.

In some embodiments, the first support region is connected to the first object region with a foil connection bridge configured to increase structural integrity of the first foil layer.

In some embodiments, the method further includes removing the foil connection bridges from the first object region.

In some embodiments, the method further includes depositing an inhibitory material including at least one of an oxide, ceramic, nitride, non-reactive salt, non-reactive metal, carbide, graphite, hydrocarbon, or carbon onto the first foil layer.

In some embodiments, the first foil layer and the second foil layer include aluminum.

In some embodiments, the method further includes aligning the second foil layer and the first foil layer by a first registration feature within the first foil layer to a second registration feature within the second foil layer.

In some embodiments, the first registration feature and the second registration feature comprise at least one of a hole, a slot, or a tab pattern.

In some embodiments, the first foil layer and the second foil layer are deposited using additive manufacturing.

In some embodiments, the first support region is connected to the first object region with a connection bridge configured to increase structural integrity of the first foil layer.

In some embodiments, the connection bridge includes at least one of a polymer or wax.

In some embodiments, the method further includes forming the connection bridge in the shape of a flexure to allow the first object region and the first support region to move relative to one another.

In some embodiments, the method further includes selectively heating and melting the bridge by applying an electric current.

In some embodiments, the method further includes dissolving the bridge with a solvent.

In another aspect, embodiments relate to a system for additive manufacturing of an object. In some embodiments, the system includes an additive manufacturing device configured to deposit a first foil layer, the first foil layer including a first object region and a first support region connected to the first object region, and deposit a second foil layer, the second foil layer including a second object region and a second support region; and an attachment mechanism configured to form an object section including the first object region and the second object region.

In some embodiments, the first support region and the second support region are configured to evenly distribute at least one of temperature and pressure to the object section.

In some embodiments, the additive manufacturing device is further configured to deposit an inhibitory material including carbon onto at least one of the first foil layer or the second foil layer.

In some embodiments, the additive manufacturing device is further configured to deposit at least two additional foil layers between the first foil layer and the second foil layer.

In some embodiments, the additive manufacturing device is configured to spot weld the second foil layer onto the first foil layer.

In some embodiments, the attachment mechanism is further configured to attach the second object region to the first object region, the attached second object region and the first object region forming the object section; and attach the second support region to the first support region, the attached second support region and the first support region forming a support section.

In some embodiments, the first support section is subdivided to facilitate piecewise removal from the object section.

In some embodiments, the system further includes a third support region connected to the first object region and a fourth support region connected to the second object region.

In some embodiments, the attachment mechanism is further configured to attach the second object region to the first object region, the attached second object region and the first object region forming the object section; attach the second support region to the first support region, the attached second support region and the first support region forming a first support section; and attach the third support region to the fourth support region, the attached third support region and the fourth support region forming a second support section.

In some embodiments, the first support section and the second support section are configured to evenly distribute temperature and pressure to the object and through the first foil layer and the second foil layer.

In some embodiments, the first support section and the second support section are configured to prevent deformation of the object section after initial deposition.

In some embodiments, the first support region is connected to the first object region with a foil connection bridge configured to increase structural integrity of the first foil layer.

In some embodiments, the foil connection bridges are configured to be removed from the first object region.

In some embodiments, the additive manufacturing device is further configured to deposit an inhibitory material including at least one of an oxide, ceramic, nitride, non-reactive salt, non-reactive metal, carbide, graphite, hydrocarbon, or carbon onto the first foil layer.

In some embodiments, the first foil layer and the second foil layer include aluminum.

In some embodiments, the system further includes an alignment mechanism configured to align the second foil layer and the first foil layer by a first registration feature within the first foil layer to a second registration feature within the second foil layer.

In some embodiments, the first registration feature and the second registration feature include at least one of a hole, a slot, or a tab pattern.

In some embodiments, the first support region is connected to the first object region with a connection bridge configured to increase structural integrity of the first foil layer.

In some embodiments, the connection bridge includes at least one of a polymer or wax.

In some embodiments, the connection bridge is in the shape of a flexure to allow the first object region and the first support region to move relative to one another.

In some embodiments, the system further includes a device configured to apply an electric current to selectively heat and melt the bridge.

In some embodiments, the system further includes a solvent applicator configured to apply a solvent to the bridge and dissolve the bridge with the solvent.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
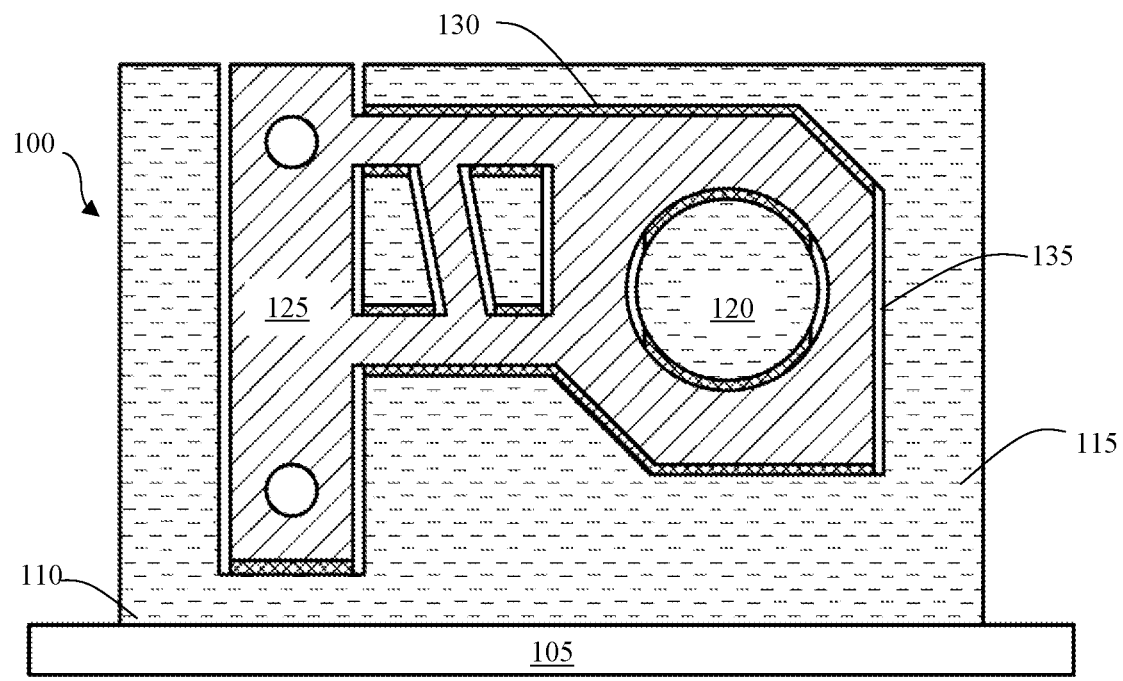
FIG. 1 depicts a side view cross section of a metal laminated object manufactured in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments described herein relate to methods and systems to enable the fabrication of complex geometries using metal LOM. In some embodiments, LOM bonds patterned sheets of foil together to form metal objects with strength equivalent to machined objects. In some embodiments, object-processing time and/or cost may be reduced because the use of appropriate selective inhibition support strategies allows objects with more complex geometries to be fabricated via LOM techniques as a comprehensive manufacturing strategy.

In some embodiments, "selective inhibition" describes a strategy where a material is deposited, removed, or altered to prevent bonding in specific areas on any number of foil sheets that comprise the manufactured object. In some embodiments, these patterned foils are configured to be stacked to form an object and its supporting structure simultaneously. In some embodiments, systems may use a bonding method to form strong metallic bonds in non-inhibited places between adjacent foil sheets. In some embodiments, a system may quench and homogenize the object to finish the object. In some embodiments, the system may employ a removal technique to separate the object from its support structure. In some embodiments, the removal technique may be used at any point after the bonding step.

The terms "foil" and "foil layer" refer to the constituent metal sheets stacked and bonded together to form an object and any supporting structures. In some embodiments, a foil has a thickness in one dimension between 10 μm and 10 mm. In some embodiments, the foil may be patterned in the other two dimensions corresponding to the design of the object(s) and its support structure(s).

A single foil layer may include at least one support region and at least one object region in some embodiments. "Support" refers to the non-object component of the foil that, when bonded together, forms a holder or jig that conforms to the object exterior and may be used in subsequent post-processing. This holder or jig, formed as a combination of multiple support regions, may be referred to as a "support section." The combination of object regions ma be referred to as an "object section."

"Bridge" refers to connections of foil or another material.

There are two broad classes of selective inhibition methods, distinguished by the plane where the bonding is inhibited. The term "vertical inhibition methods" refers to the group of methods that involve inhibiting bonding on the boundary(s) between an object region and a support region within a single foil. The second class of inhibition methods, termed "horizontal inhibition methods," encompasses inhibition strategies where the inhibition boundary between the object region and support region of two adjacent foils.

Embodiments of vertical inhibition methods may include at least one of cutting the outline of the object region on a given foil layer using a laser, plasma cutter, drag knife, die cutter, milling, or other means. In some embodiments, the width of the vertical inhibition region cuts should be sufficient to prevent the object region from contacting the support region in the subsequent foil bonding step. In some embodiments, it is not advantageous to cut the full perimeter of the object region and completely separate it from the foil. In some embodiments, the presence of bridges between the object region and the support region allows foils to be handled prior to bonding and allows complex geometries to be fabricated with higher reliability. In some embodiments, the bridges in the vertical inhibition region may include incomplete or interrupted cuts that perforate the foil, leaving small areas of foil between the object regions and support regions. In some embodiments, the cuts may be made with a laser. Foils may be patterned in a way that generates flexure joints between object sections and the support sections, which can ease object section removal after bonding. In some embodiments, connection bridges between the support regions and object regions may be in the shape of a flexure to allow the object regions and the support regions to move relative to one another.

In some embodiments, additional material such as wax, polymer, a mixture of polymers, or metals may be added to the gap between the support region and the object region of the foil to form a bridge between the support region and the object region. In some embodiments, a person having ordinary skill in the art may select a bridge material that is solid at room temperature, has a melting point below the bonding temperature, does not react chemically with the foils, and decomposes into the liquid or gas phase for ease of removal. In some embodiments, this method may comprise temporarily bonding the current layer of foil to the previous layer prior to the final foil bonding process by laser spot welding, electric spot welding, use of an adhesive that will be cleanly burnt off during final bonding, or mechanically deforming the current layer to interlock it with the previous layer.

Additional registration features or patterns may be cut into each foil layer to aid in the alignment of subsequent foil layers in some embodiments. These features or patterns may be located within the object region, support region, or edge of foil. In some embodiments, the registration feature in the support region may be a hole and slot that could locate on two vertical pins. In some embodiments, subsequent foil layers may be stacked using the pins to maintain alignment between layers. In some embodiments, the registration features on the edge of the foil layer may be a cut on the edge of the foil. Then, in some embodiments, the foil layers may be pressed against two or more machined or ground surfaces. In some embodiments, the system may apply either a small preload from the side or a clamping force to the top to keep the foil layers aligned during transport.

In some embodiments, a small tab pattern may be cut and bent slightly out of plane with the foil layer. In some embodiments using the tab pattern, no external registration feature may be required when each foil layer tab pattern is configured to interlock with the next.

FIG. 1 depicts a side view cross section of a metal laminated object 100 manufactured in accordance with one embodiment. In some embodiments, the object 100 may be manufactured on a print bed 105. In some embodiments, a foil layer 110 may be deposited onto the print bed 105. The foil layer 110 may comprise at least one of external support regions 115, internal support regions 120, or object regions 125. In some embodiments, multiple foil layers may be deposited either directly onto the first foil layer 110 or may be later added on top of the first foil layer 110. Each foil layer 110 may comprise at least one of external support regions 115, internal support regions 120, or object regions 125. As discussed in more detail below, the foil layer 110 may comprise at least one of horizontal inhibition regions 130 or vertical inhibition regions 135.

In some embodiments, the inhibition regions 130, 135 may be formed at the intersection of an object region 125 and a support region 115 by cutting the foil layer 110 to form at least part of a vertical inhibition region 135 or interrupting the top surface of the foil material of the current foil layer 110 to form at least part of a horizontal inhibition region 130.

Figure 2:
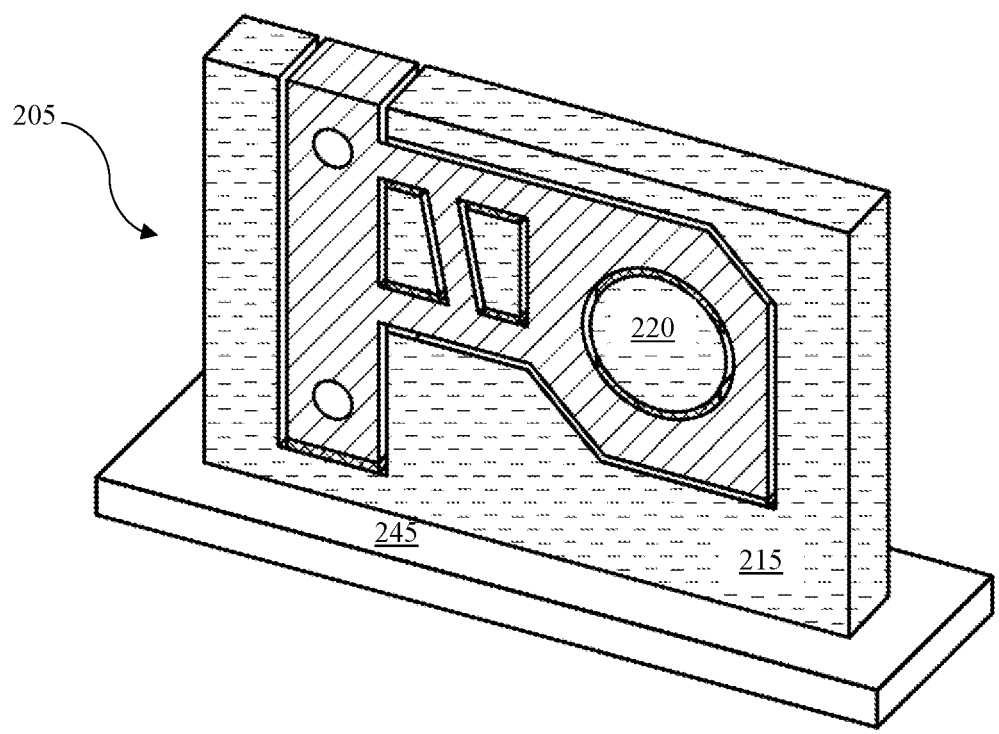
FIG. 2 depicts trimetric and object views of the metal laminated object of FIG. 1.
Figure 2:
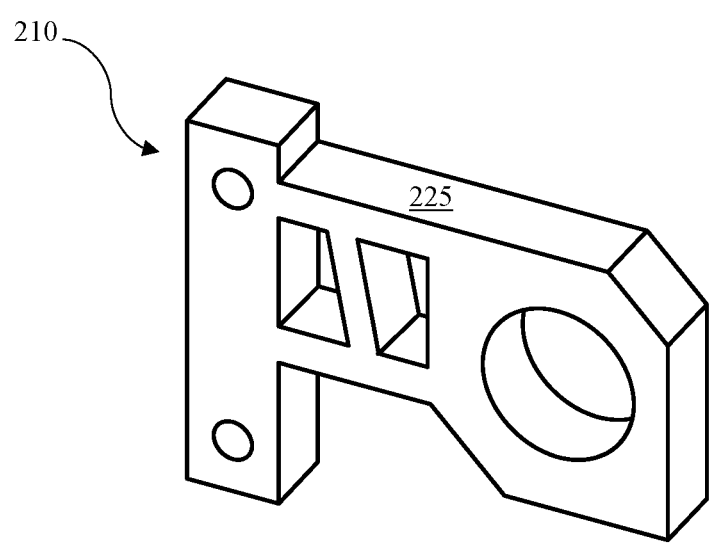

FIG. 2 depicts trimetric 205 and object 210 views of the metal laminated object of FIG. 1. The object may be enclosed in support sections 215, 220 and, as explained in further detail below, those support sections 215, 220 may be removed after the object section 225 is formed to finalize the metal laminated object. In some embodiments, the object section 225 may be offset upward from the bed 245 to ensure the bonding and inhibition processes are consistent throughout the object section 225.

Figure 3:
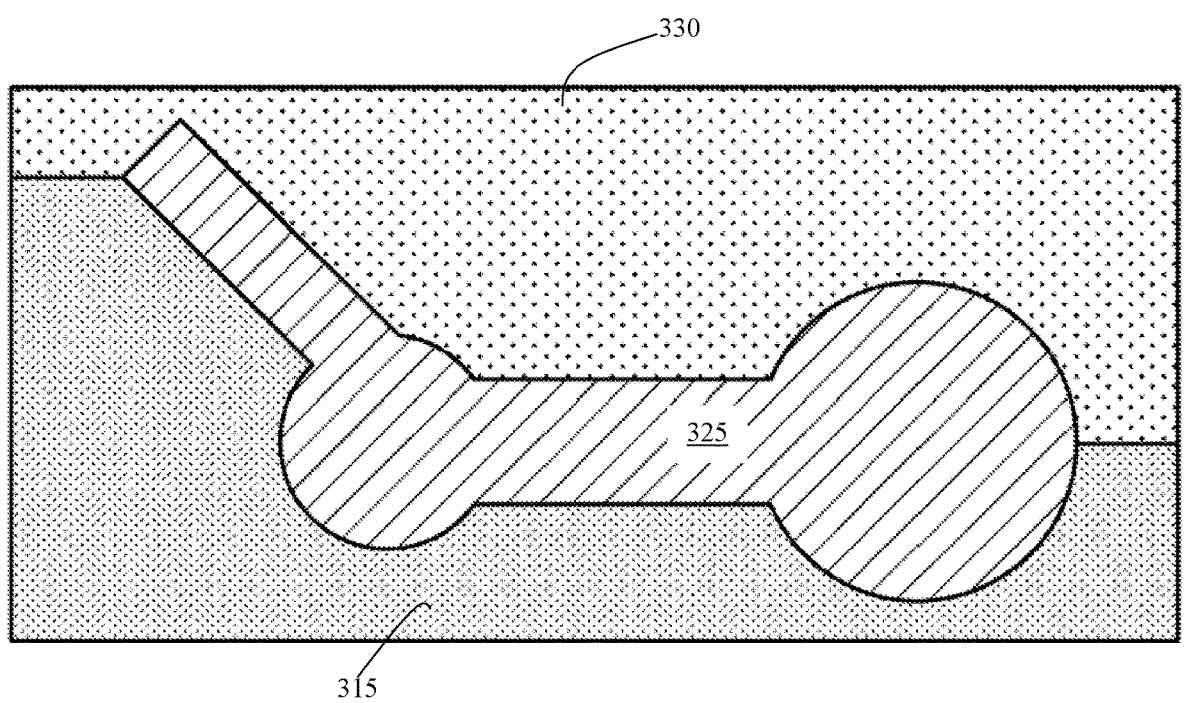
FIG. 3 illustrates alloy metal laminated object supports in accordance with one embodiment.

For example, as shown in FIG. 3, the object region 325 may be deposited between two support regions 315, 330 in accordance with one embodiment. In some embodiments, the support regions 315, 330 may improve the strength of the laminated metallic object body region 325 by creating a mold around the object(s) to evenly apply heat and pressure during the bonding process. Similar to a water bath used in baking, the solid mold may help to conduct heat and apply pressure more evenly than if the heat and/or pressure were applied directly to the object region 325 or only to the print bed (not shown). In some embodiments, the support regions 315, 330 may comprise waste material that a similar object was fabricated from. In some embodiments, the outer surface of the support regions 315, 330 may be flat. In some embodiments, the support regions 315, 330 may be configured to fully encapsulate the object region 325.

Figure 4:
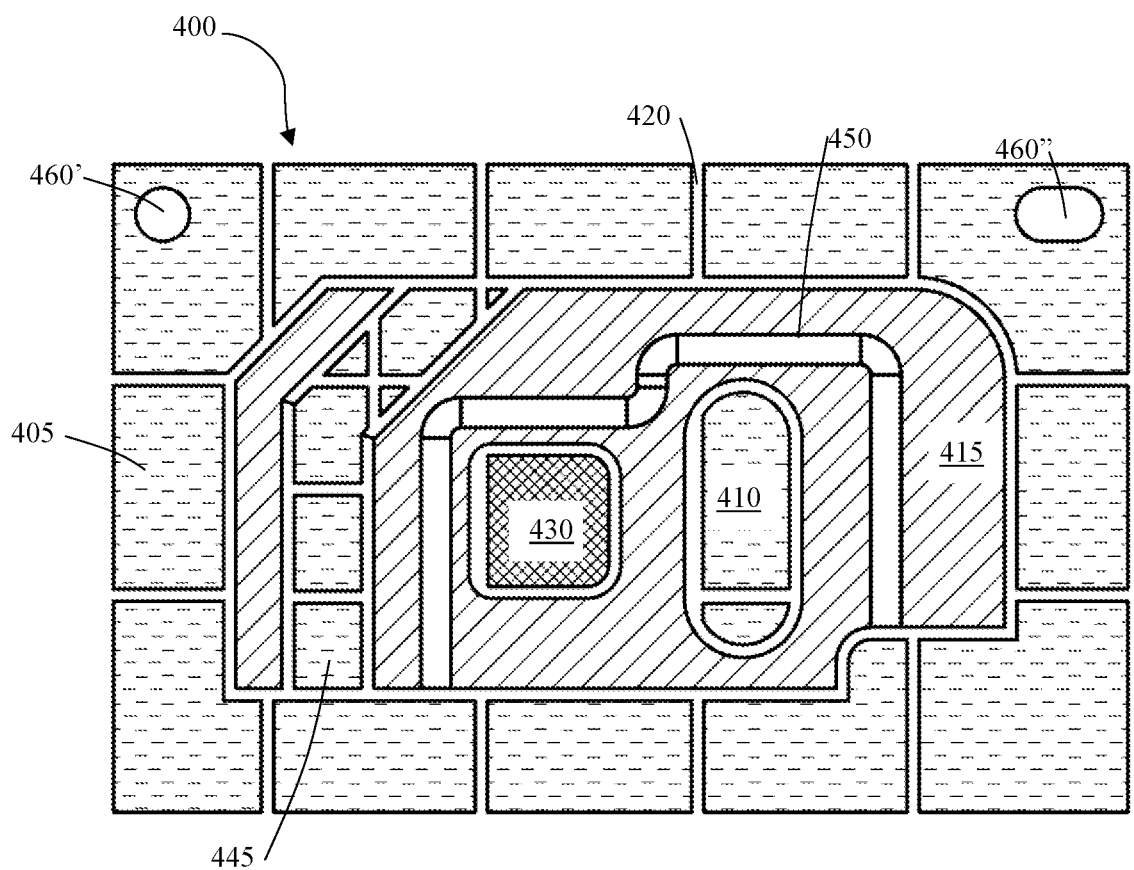
FIG. 4 depicts a top-down cross-section of a metal laminated object manufactured in accordance with one embodiment.

FIG. 4 depicts a top-down cross-section of a metal laminated object 400 manufactured in accordance with one embodiment. In some embodiments, each foil layer of the object 400 may comprise external support regions 405, internal support regions 410, object regions 415, vertical inhibition regions 420, and horizontal inhibition regions 430. In some embodiments, the support regions 405, 410 may be vertically split and may be configured to be separated from the object region 415. In some embodiments, to prevent trapped support regions 405, 410, the large internal channel split distance may be reduced. In some embodiments, an object region 415 may comprise at least one small feature 450 which does not require support. In some embodiments, the small feature 450 may be an internal cooling channel. As discussed in further detail below, some embodiments may comprise a registration feature, such as a pair of holes 460', 460", configured to allow alignment pins to be inserted while the object section, comprising a plurality of object regions 415, is assembled.

Figure 5:
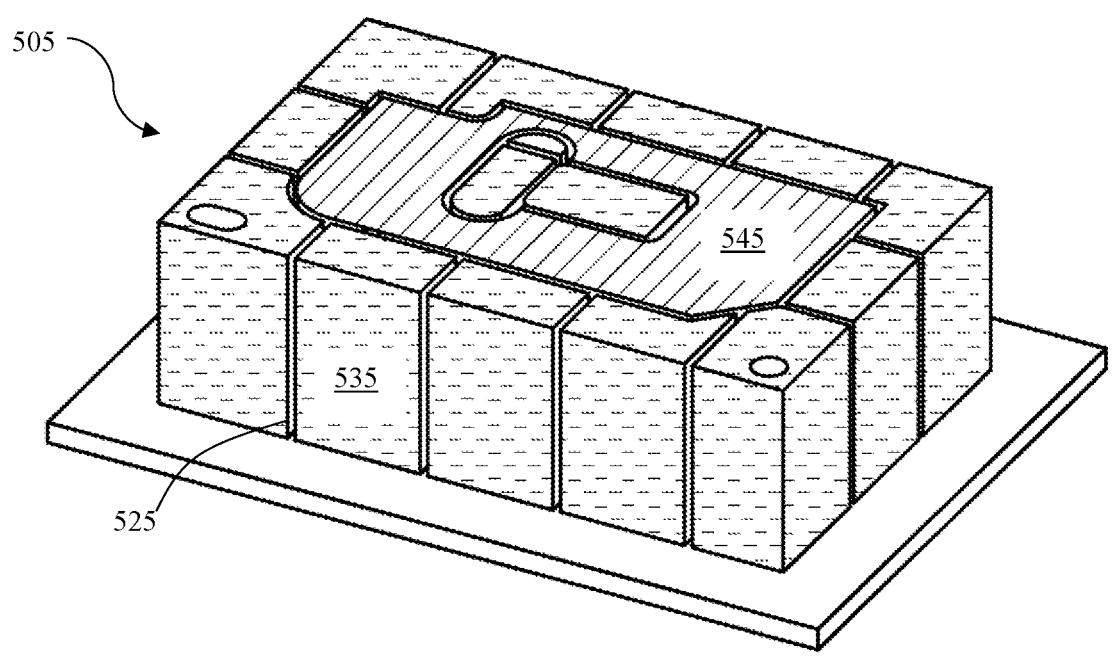
FIG. 5 depicts trimetric and object views of the metal laminated object of FIG. 4.
Figure 5:
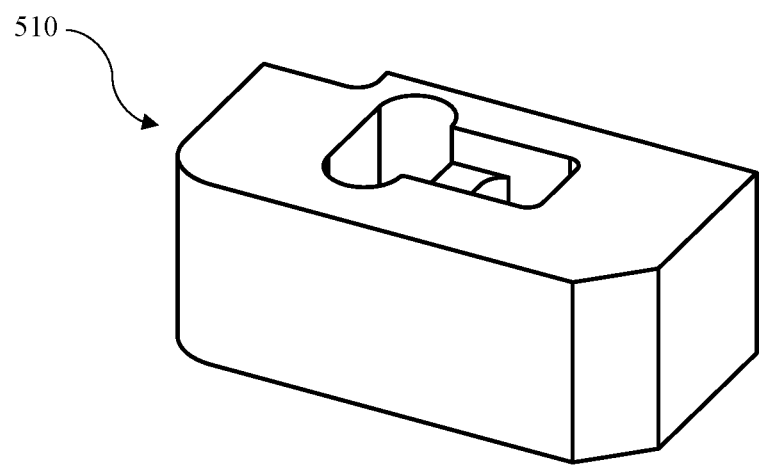

FIG. 5 depicts trimetric 505 and object 510 views of the metal laminated object of FIG. 4. In some embodiments, support sections 535 may be split vertically 525 using a foil cutting tool (not shown), such as a laser, plasma cutter, drag knife, die cutter, milling, or other means. in some embodiments, this split enables easier separation between the support sections 535 and the object sections 545. In some embodiments, the support sections 535 may be split in a grid like pattern to facilitate easy support removal. In some embodiments, support sections 535 may be spaced from 2 mm to 100 mm apart, depending on the size and shape of the object 510. In some embodiments, support section 535 may be spaced far apart if the object section 545 is a flat shape parallel to the support section 535. In some embodiments, the support section 535 may have narrower spacing if the object section 545 has a twisted or complicated shape relative to the support section 535.

Figure 6:
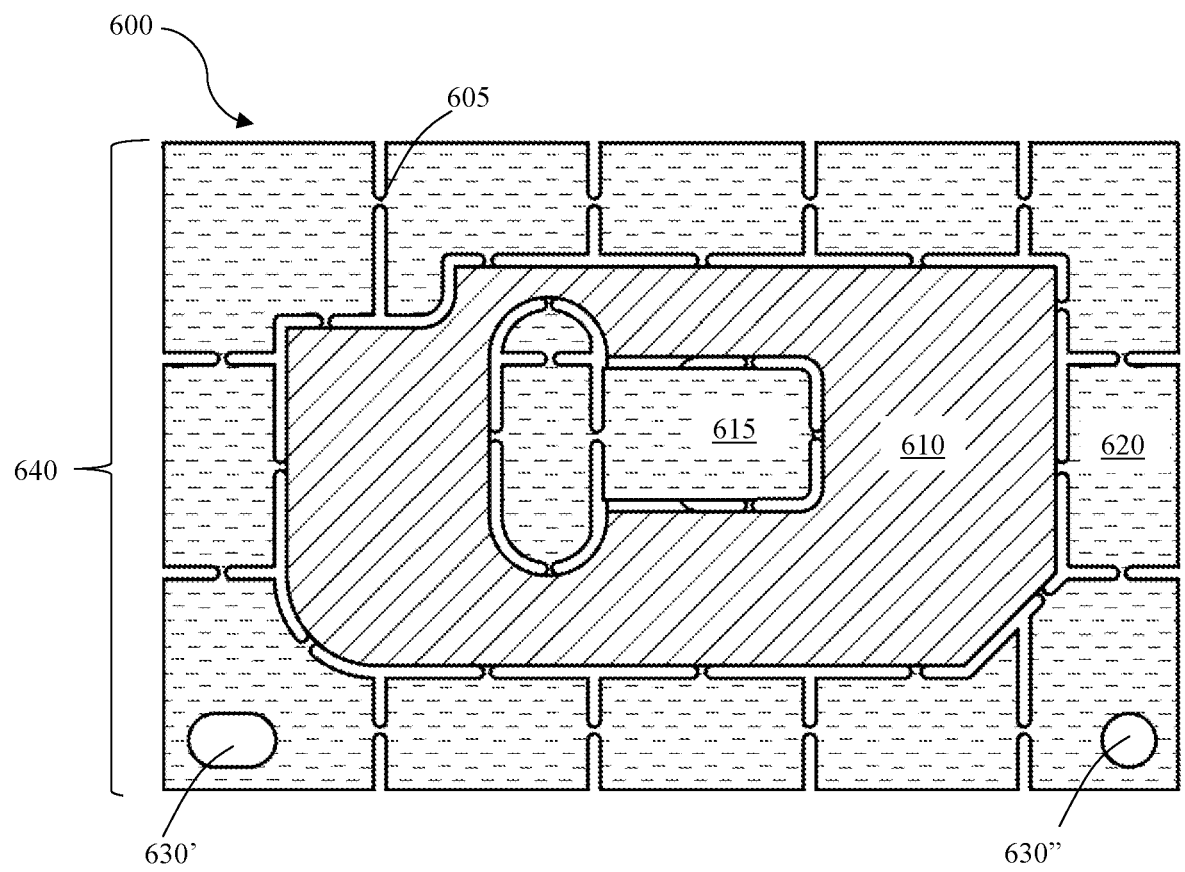
FIG. 6 depicts a top-down cross section of a metal laminated object manufactured with foil bridges in the vertical inhibition regions in accordance with one embodiment.

FIG. 6 depicts a top-down cross section of a metal laminated object 600 manufactured with foil bridges 605 in the vertical inhibition regions in accordance with one embodiment. In some embodiments, the metal is aluminum. Some embodiments may use a method for keeping laminated metallic object regions 610 aligned prior to bonding by weakly connecting object regions 610 to support regions 615, 620 within a layer using bridges 605 and keeping subsequent layers aligned by cutting registration feature(s) 630', 630" (collectively, 630) into each layer 640. Some embodiments may align between two and 2,000 foil layers. Some embodiments may locate the registration features 630, such as holes, with a removable precision surface (not shown) prior to adding another foil layer. In some embodiments, the removable precision surface(s) for locating the registration features 630 are pins configured to be separated from the object region 610 after bonding. In some embodiments, the removable precision surface may be aligned, such that the foils are configured to be pressed against a surface before a preload is applied to lock them in place. In some embodiments, the registration features 630 may be cut into at least one of the object region 610 or the support regions 615, 620.

In some embodiments, the foil bridges 605 between the object region 610 and the support regions 615, 620 are configured to increase the strength of the foil layer 640. In some embodiments, the increased strength allows the foil layers to be transported without detaching the object region 610 from the support regions 615, 620. In some embodiments, the bridges 605 are formed by performing a perforated cut. In some embodiments, the bridges 605 are made out of a different metal or metal alloy than the object region 610.

Some embodiments may use removal techniques associated with vertical inhibition methods to detach or otherwise remove the bridges 605 between the support regions 615, 620 and the object region 610. Vertical inhibition methods may comprise physically breaking bridges 605, chemically breaking bridges 605, electrically breaking bridges 605, or any combination thereof.

In some embodiments of vertical inhibition methods, the bridges 605 are physically broken and removed. In some embodiments, breaking bridges enables the support sections comprising a plurality of support regions 615, 620 to be detached and removed from the object, comprising a plurality of object regions 610. In some embodiments, the bridges 605 may be broken after a plurality of foil layers 640 are bonded together. The bridges 605 may be cut via the same methods as were used to cut the individual foil layers 640, including lasers, plasma cutters, drag knives, die cutters, milling, or other physical means. In some embodiments, each bridge 605 may be cut multiple times to reduce the bridge to smaller debris or a powder. This may allow the debris to be easily removed with a vacuum or by forcing a gas or fluid through the assembly. For some geometries, it may be possible to puncture the bridge 605 with an awl or expanding pin (not shown).

In some embodiments, the bridges 605 prevent a punchout by allowing easy removal of support sections after stacking and attaching foil layers.

Figure 7:
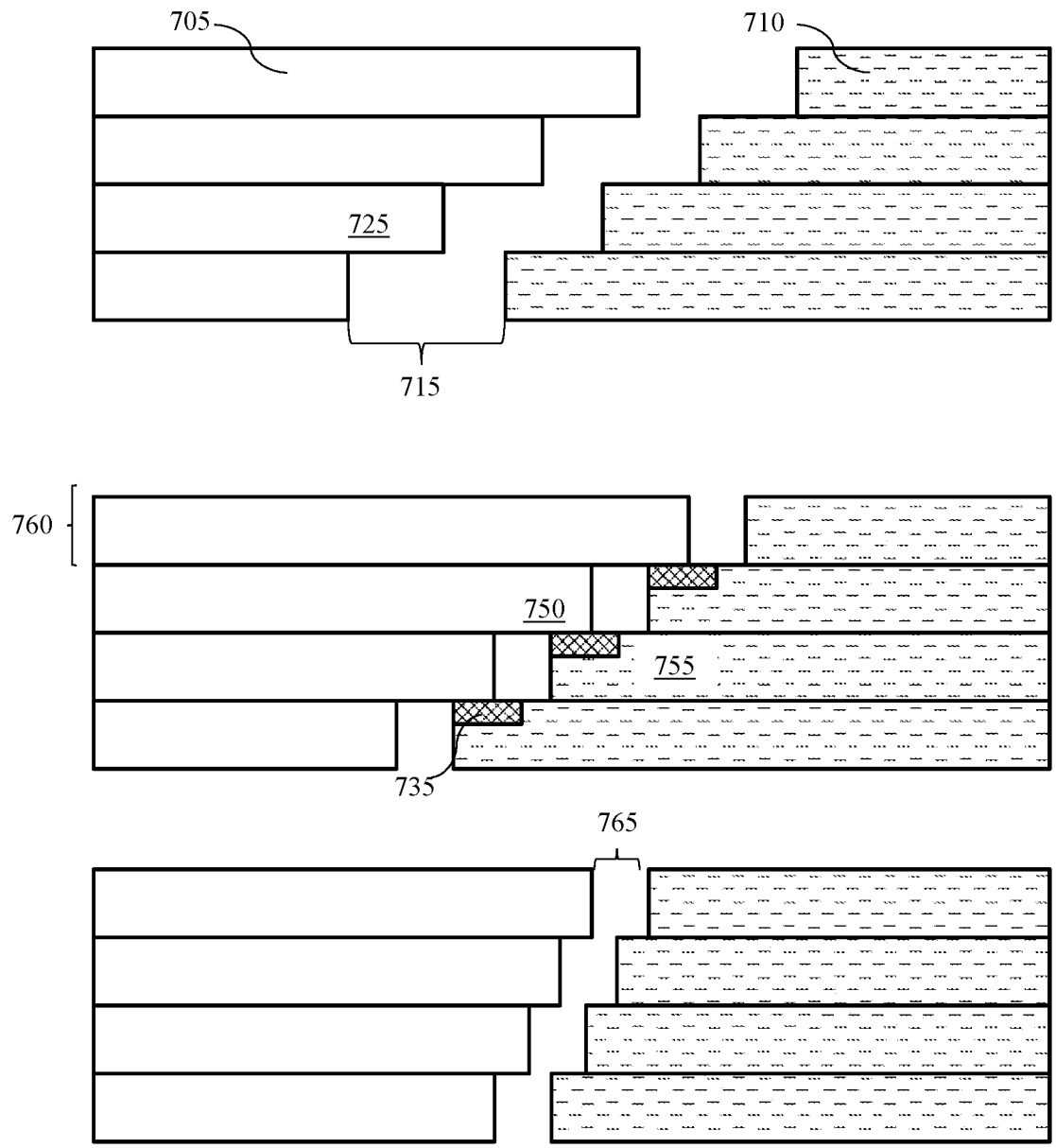
FIG. 7 depicts a cross section of the inhibition region between support regions and object regions in the individual foil layers in accordance with one embodiment.

FIG. 7 depicts cross sections of inhibition regions between object regions 705 and support regions 710 in the individual foil layers in accordance with one embodiment. In some embodiments, the object regions 705 and support regions 710 may have a width 715 wide enough to prevent overhung foils from contacting the previously deposited layer 725. In some embodiments, when the width 715 is wide enough, no horizontal inhibition region is needed.

In some embodiments, an inhibition region 735 may be formed on the previous layer when the cut width is narrow, and the overhung foils do contact the previous layer. The inhibition region 735 is configured to prevent permanent bonding of the object region 750 of the subsequent layer with the support region 755 of the previous layer.

Methods to create horizontal inhibition regions 735 include at least one of deposition of an inhibitory material and ablation of the foil surface. Horizontal inhibition is successful when the inhibitory material is stable at the bonding temperature, preventing the formation of bonds between foils, or alternatively the foils are not in surface contact to form a bond in some embodiments.

In some embodiments, an inhibitory material is selectively deposited on the foil layer to create a horizontal inhibition region 735. The inhibitory material may be an oxide, ceramic, nitride, non-reactive salt, non-reactive metal, carbide, graphite, hydrocarbon, or other form of carbon in some embodiments. In some embodiments, the inhibitory material may be an oxidizing agent that reacts with the foil to form an oxide layer. In some embodiments, the inhibitory material may be deposited via various methods, including an inkjet, marker, or paste extruder or other deposition technique which would be a recognizable equivalent by someone of ordinary skill in the art. In some embodiments, metal oxides and ceramics may be suspended in a solution to aid in deposition. In some embodiments, deposition aids may comprise at least one of titanium oxide, aluminum oxide, zirconium oxide, carbides, boron nitride, titanium nitride, or carbon. In some embodiments, heat or a laser may be used to promote the formation of an oxide layer on the surface of the foil.

In some embodiments, the horizontal inhibition may be applied to the boundaries between the object regions 750 and support regions 755. In some embodiments, horizontal inhibition may be applied to the support regions 755 after every layer. In some embodiments, the layers may be split horizontally every 3 to 500 layers, depending on the thickness of the foil layer 760. In some embodiments, a foil layer 760 may have a thickness of between 100 μm and 500 μm. In some embodiments, support spacing and horizontal inhibition intervals may be adjusted to prevent the object region 705 from becoming mechanically interlocked with the support regions 710.

In some embodiments of horizontal inhibition methods, the surface of the foil is ablated with a laser, leaving a void between subsequent foil layers. The height of the void space may be greater than the distance the metals expand during the bonding step to prevent contact between the two foils. In some embodiments, surface oxidation caused by the laser ablation will serve to inhibit bonding as if a metal oxide or other ceramic powder were deposited on the surface.

In some embodiments, a horizontal inhibition region 765 may be absent when the angle is steep enough that the overhung foils do not contact the previous layer even though the cut width is narrow.

Figure 8:
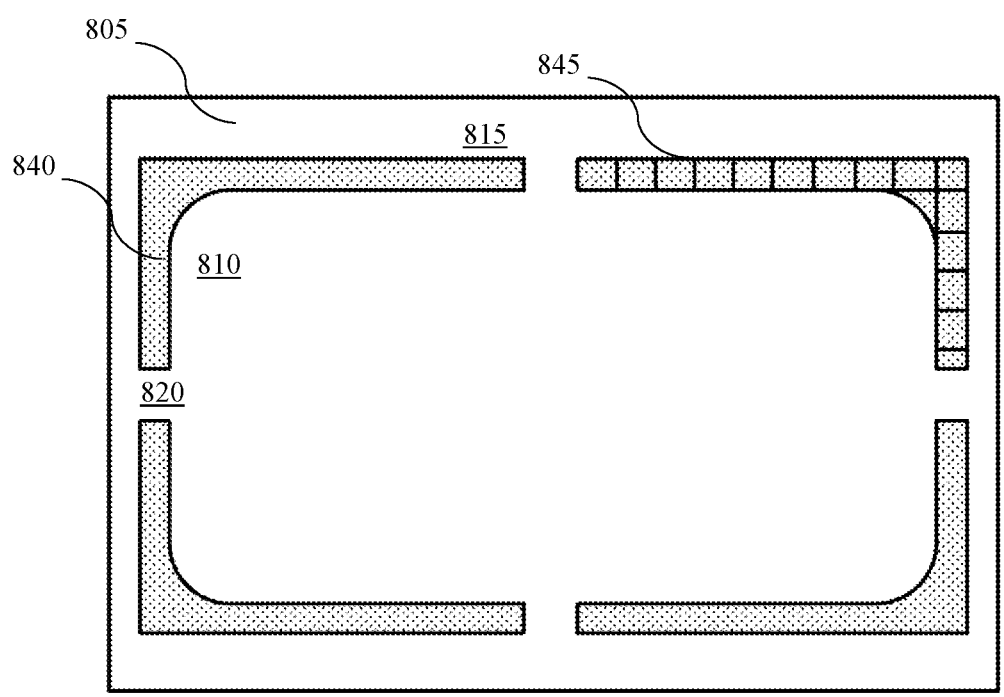
FIG. 8 depicts a patterned and cut top foil in a stack of foil sheets in accordance with one embodiment.

FIG. 8 depicts a patterned and cut top foil in a stack of foil sheets 805 in accordance with one embodiment. In some embodiments, the foil sheets 805 are patterned and cut, such that the object region 810 is connected to the remainder, comprising the support region 815, via a bridge 820. In some embodiments, the foil sheets 805 may comprise a vertical inhibition region 840 to be removed. This region 840 can be cut via an additional series of grid lines 845 to ease removal in some embodiments.

In some embodiments, the grid lines 845 may be cut with consistent spacing around the object region 810. In some embodiments, each support region 815 may be split depending on the size and shape of the object geometry to prevent interlocked support sections. In some embodiments, both vertical cuts and horizontal inhibition methods may be used to facilitate the splitting and removal of support regions 815. In some embodiments, additional layers of horizontal inhibition may be applied to ease the removal of objects stacked in the z direction.

Figure 9:
FIG. 9 depicts cutting a pattern using a statistical bridging method in accordance with one embodiment.

FIG. 9 depicts cutting a pattern using a statistical bridging method in accordance with one embodiment. In some embodiments, an object pattern 905 on a foil 910 is cut via a laser or another tool which ablates a portion of the foil in accordance with some embodiments. The ablation may occur periodically along the object pattern 905 at a given frequency. The overlap between at least two of the ablations cuts the full thickness of the foil. In some embodiments, the cut depth may vary at different positions along the cut line 915 as shown in depth profile 920.

Figure 10:
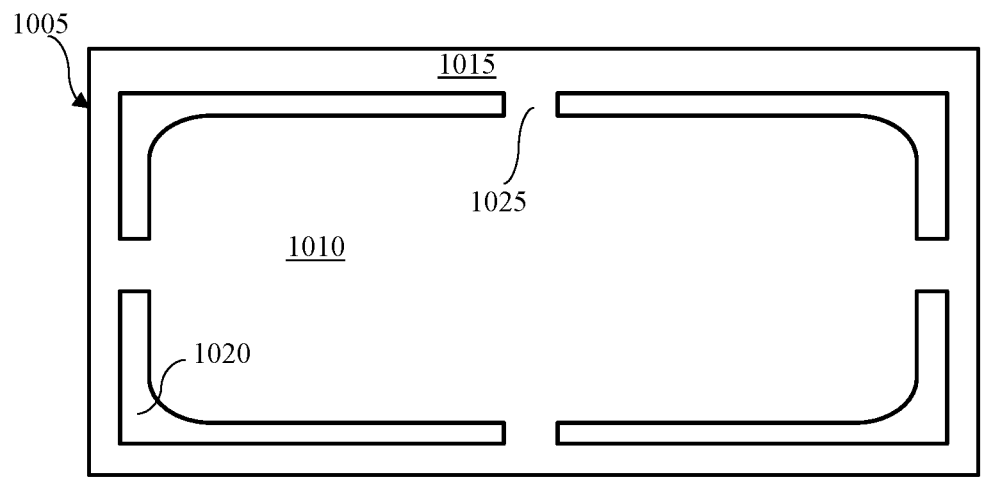
FIG. 10 depicts the fracturing of bridges through thermal expansion in accordance with one embodiment.
Figure 10:
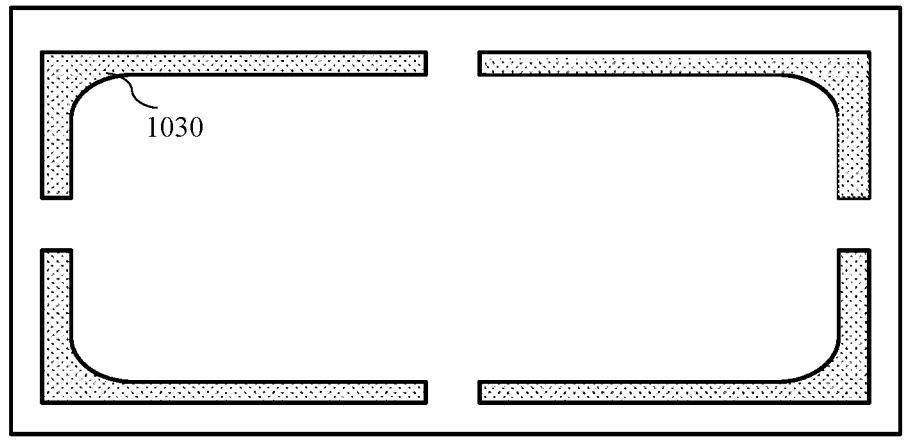
Figure 10:
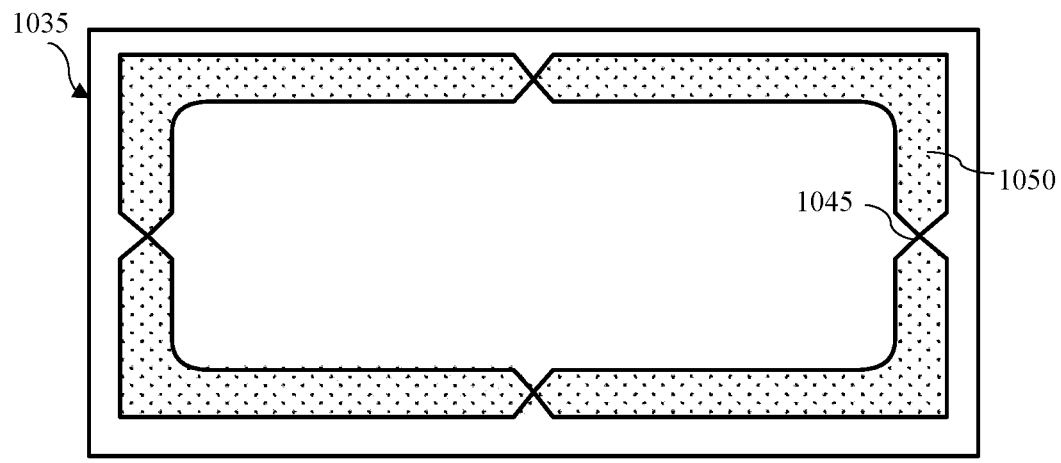

FIG. 10 depicts the fracturing of bridges through thermal expansion in accordance with one embodiment. In some embodiments, a foil sheet 1005 is patterned into an object region 1010 and remaining support region 1015 via cutting the pattern 1020. Bridges 1025 connect the object region 1010 to the foil sheet 1005 in some embodiments.

In some embodiments, a void space is formed by removing the material of pattern and filling a cut zone 1030 with a secondary material with a greater coefficient of thermal expansion than the foil. In some embodiments, the secondary material may have a greater coefficient of thermal expansion than the support region. In some embodiments, the secondary material may not react with the object region or the support region.

Heat may then be transferred to or from the object and/or foil, causing thermal expansion 1035. The expanded secondary material 1050 strains the bridges 1045 until they are fractured or otherwise are easily separable in some embodiments.

In some embodiments, the material 1050 may be water or another material configured to expand when frozen. In some embodiments, cold may be applied to or from the object and/or foil, causing expansion and fracturing of bridges until the secondary material and object are easily separable. In some embodiments, the expansion may fracture tabs to detach support regions 1015 from object regions 1010.

In some embodiments, the bridges 1045 may be broken through thermal shock. In some embodiments, the bridges 1045 may be broken when the object is quenched following the bonding process. This method may be employed if the bridges 1045 have a different rate of thermal expansion than the object region 1010, such as the case where the bridges 1045 are formed with a different metal or a different metal alloy than the object region 1010.

Figure 11:
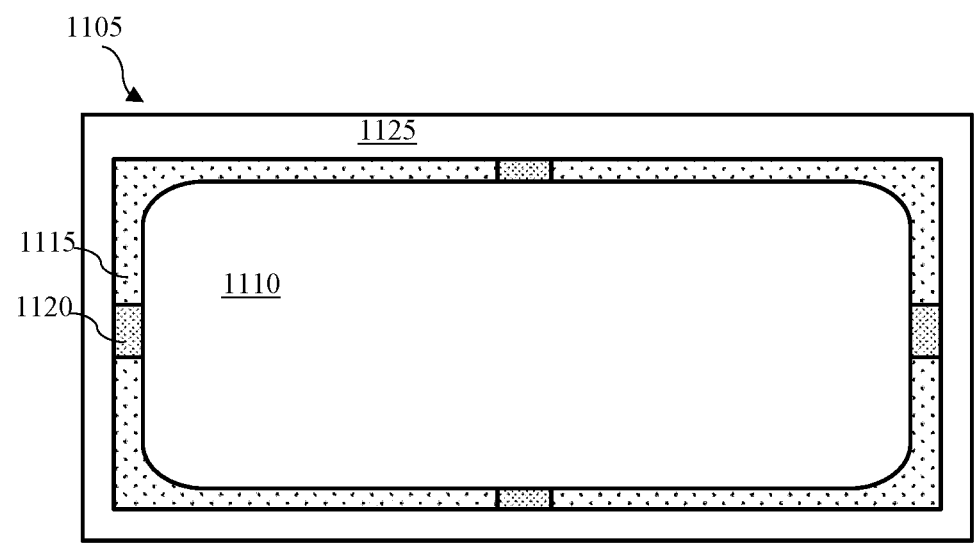
FIG. 11 depicts a foil prepared using wax bridges in accordance with one embodiment.

FIG. 11 depicts a foil prepared using wax bridges in accordance with one embodiment. In some embodiments, the foil sheet 1105 is patterned with the object region 1110 and a vertical inhibition region 1115 fully cut around its perimeter. After cutting, wax is deposited to form temporary bridges 1120 between the object region 1110 and the support region 1125 in some embodiments. In some embodiments, the full external surface of the object region 1110 may be fully separated from the support region 1125, with wax or a polymer deposited to form temporary bridges 1120 between the object region 1110 and the support region 1125. In some embodiments, this wax melts and thermally decomposes at a lower temperature than the object region 1110, allowing it to be removed when heat is applied. In some embodiments, heat may be applied during the bonding step.

In some embodiments, the bridges 1120 between the support region 1125 and the object region 1110 may comprise a modified material that can be more easily removed during the bonding step. For example, the deposition of copper, zinc, silicon, or another alloying metal on bridges 1120 will cause the bridges 1120 to have different material properties than the support region 1125 and object region 1110. The composition of the bridges 1120, after the deposition, may form a eutectic system that melts at a temperature lower than the support region 1125 and the object region 1110, and thus can be melted away during the bonding step.

Figure 12:
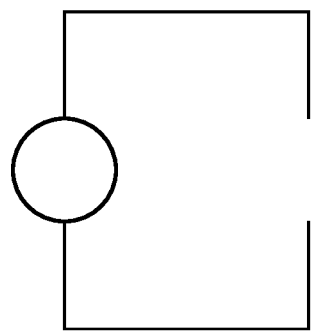
FIG. 12 depicts joule heating being employed to fracture bridges in accordance with one embodiment.

FIG. 12 depicts joule heating being employed to fracture bridges in accordance with one embodiment. In some embodiments, a power system 1205 is put in series with the object 1210. In some embodiments, a current is applied across the bridge with electrode contacts at points 1215 and 1220. In some embodiments of vertical inhibition methods, an electric current can be applied across the bridges between the object and the support section. The applied current may be great enough to cause resistive heating that melts or deforms the supporting bridge, separating the object from the support body. In some embodiments, this may be used to fracture bridges or non-visible tabs.

Figure 13:
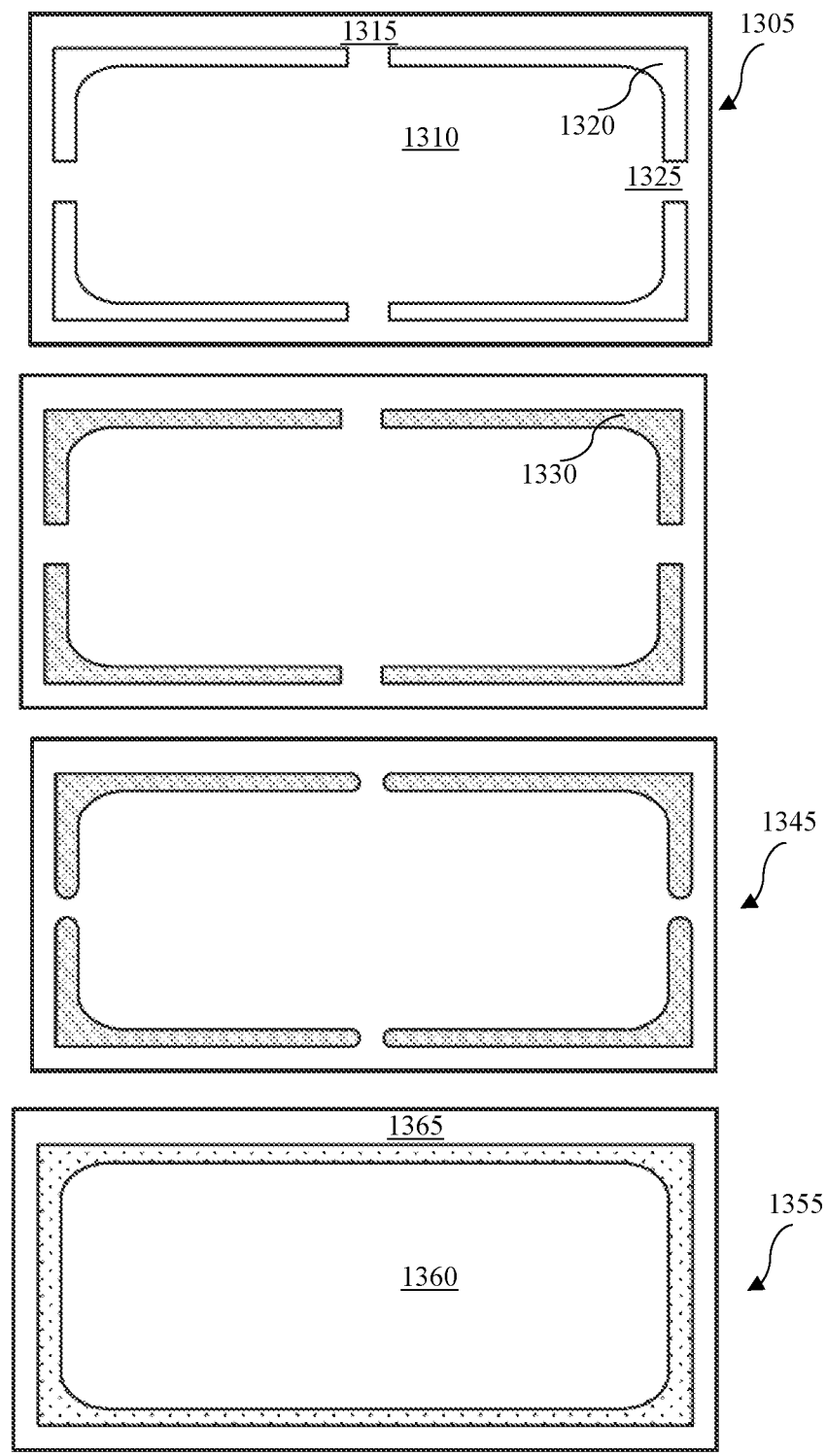
FIG. 13 depicts a foil sheet being processed with a solvent used to selectively dissolve bridges in accordance with one embodiment.

FIG. 13 depicts a foil sheet being processed with a solvent used to selectively dissolve bridges in accordance with one embodiment. In some embodiments, a foil sheet 1305 may be patterned with an object region 1310 and may have a remaining support region 1315 established by vertical inhibition regions 1320 and intact bridges 1325.

In some embodiments, the gap region formed inside the pattern may be partially or wholly filled with a corrosive solution 1330. In some embodiments, when a solvent is applied to a foil sheet 1305, the bridges 1325 may begin to dissolve 1345. In some embodiments if a sufficient amount of solvent is applied to the foil sheet 1305, the object region 1360 may be fully severed 1355 from the support region 1365, and the bridges may be fully dissolved.

In some embodiments of vertical inhibition methods, bridges 1325 may be selectively reacted, corroded, or otherwise dissolved by the application of an alkaline solution to the surface. In some embodiments, solutions containing sodium hydroxide or potassium hydroxide will dissolve aluminum bridges 1325 preferentially, as the bridges 1325 generally have a higher surface area per unit volume than the object region 1310 and support region 1315 and thus will dissolve at a faster rate without appreciably damaging the object and support regions. In some embodiments, a system may apply heat to increase the rate of reaction to dissolve the bridges 1325.

In some embodiments, especially for more complicated 3D geometries, such as those requiring angled or curved surfaces that do not correspond to perpendicular axes, both vertical and horizontal inhibition methods may be employed simultaneously in one design. The application of any combination of the above vertical and horizontal inhibition methods requires a system to deconflict the placement of bridges with horizontal inhibition sections that overlap the bridges on an adjacent foil. The method employed to determine the number of bridges and their placement depends on the inhibition method, removal technique, features of the object design, and material properties of the foils. The method may comprise a threshold for determining the minimum number of bridges per pattern feature or perimeter in some embodiments. The method may comprise a threshold for determining when to generate horizontal inhibition regions based on the object overhang angle and/or cut width, and/or placing horizontal inhibition regions when an adjacent foil would come into contact with a support section in some embodiments. In some embodiments, this method may have a lower area limit for generating horizontal inhibition regions, assuming under a certain area the horizontal inhibition region cannot be accurately formed. In some embodiments, this method may involve offsetting the object upward from the bed and generating a support section under it. In some embodiments, the offset may provide a rigid platform for handling the object prior to final foil bonding, may ensure that the bonding and inhibition processes are consistent throughout the object, and/or may allow for a lower tolerance print bed to be used both in terms of flatness and the absolute starting position of the bed.

Figure 14:
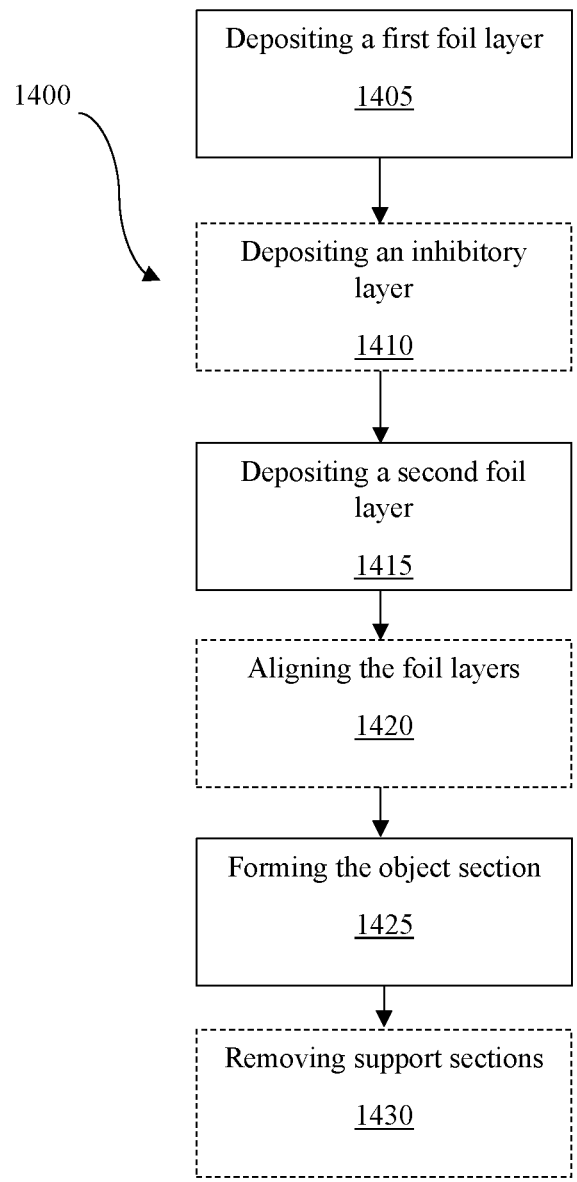
FIG. 14 schematically shows a method for the additive manufacturing of an object in accordance with one embodiment.

FIG. 14 schematically shows a method 1400 for the additive manufacturing of an object in accordance with one embodiment. In some embodiments, the method comprises depositing a first foil layer (Step 1405). In some embodiments, the first foil layer may be deposited onto a print bed. In some embodiments, the first foil layer may be deposited onto a foil layer. The first foil layer may comprise an object region and at least one support region connected to the object region. The first foil layer may comprise an object region and a plurality of support regions connected to the object region. In some embodiments, the method further comprises depositing a second foil layer (Step 1415). In some embodiments, the foil layers may be deposited using additive manufacturing. In some embodiments, an inhibitory layer may be deposited before depositing the second foil layer (Step 1410). In some embodiments, the inhibitory layer may be deposited simultaneously with depositing a foil layer. In some embodiments, the inhibitory material may comprise at least one of oxide, ceramic, nitride, non-reactive salt, non-reactive metal, carbide, graphite, hydrocarbon, or carbon.

In some embodiments, the method comprises aligning the foil layers (Step 1420). In some embodiments, the layers may have a registration feature within a support region or the object region. In some embodiments, the method may align the registration features and, by aligning the registration features, the foil layers may be aligned. For example, in some embodiments, the registration features may be at least one of a hole, tab, or slit and the aligning step may comprise temporarily threading a pin through the registration features to align the foil layers.

In some embodiments, the method comprises forming an object with the foil layers (Step 1425). In some embodiments, the object comprises the object regions in the foil layers. In some embodiments, forming the object comprises spot welding the foil layers together. In some embodiments, forming the object comprises applying at least one of heat and pressure to the foil layers. In some embodiments, after the foil layers are aligned, the object regions in each foil layer are attached to the object regions in the other foil layers to form an object section. Additionally, at least some of the support regions in each foil layers are attached to least some of the support regions in the other foil layers to form support sections. In some embodiments, the support sections are configured to evenly distribute temperature and pressure to the object section and through the first foil layer and the second foil layer. In some embodiments, the support sections are configured to prevent deformation of the object section after initial deposition.

In some embodiments, the method further comprises removing the support sections (Step 1430). In some embodiments, the support sections may be subdivided to facilitate piecewise removal from the object. In some embodiments, the support sections may be removed by breaking connection bridges from the object.

Figure 15:
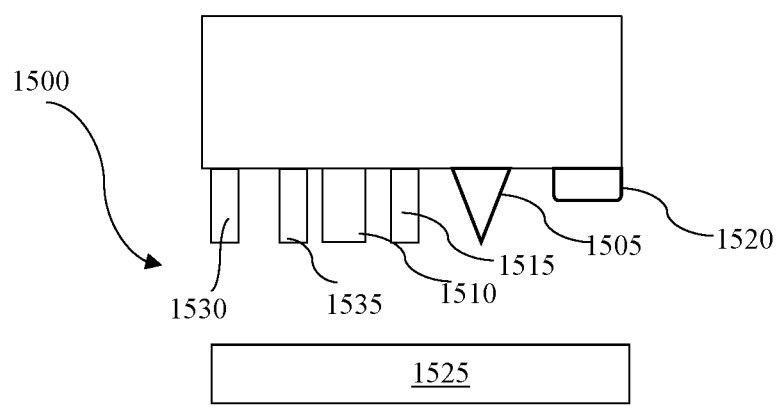
FIG. 15 shows a system for additive manufacturing of an object in accordance with one embodiment.

FIG. 15 shows a system 1500 for additive manufacturing of an object in accordance with one embodiment. In some embodiments, the system may comprise an additive manufacturing device 1505 configured to deposit foil layers comprising object regions and support region. In some embodiments, the device 1505 may deposit the foil layers onto a print bed 1525. In some embodiments, the additive manufacturing device 1505 is configured to deposit an inhibitory material comprising at least one of an oxide, ceramic, nitride, non-reactive salt, non-reactive metal, carbide, graphite, hydrocarbon, or carbon onto a foil layer. In some embodiments, the additive manufacturing device 1505 is configured to spot weld foil layers together.

The system 1500 may comprise an attachment mechanism 1510 configured to form an object from the object regions of the foil layers. The attachment mechanism 1510 may be configured to attach the support regions of the foil layers. In some embodiments, the attachment mechanism 1510 may be configured to apply at least one of heat and pressure to the foil layers to form the object.

In some embodiments, the system 1500 may comprise a separator 1515 configured to facilitate removal of the support sections from the object. In some embodiments, the separator 1515 is configured to remove support sections piecewise from the object.

In some embodiments, the system 1500 may comprise an alignment mechanism 1520 configured to align registration features within the foil layers. In some embodiments, the system 1500 may comprise a device 1530 configured to apply an electric current to selectively heat and melt the bridge. In some embodiments, the system 1500 may comprise a solvent applicator 1535 configured to apply a solvent to the bridge and dissolve the bridge with the solvent.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

What is claimed is:

1. A method for additive manufacturing of an object, the method comprising:
  forming vertical inhibition regions in a plurality of foil
    layers through cutting, each cut through a foil layer of the plurality of foil layers mechanically defining a boundary between a support region and an object region in the foil layer; forming, through selective depositing of an inhibitory material on a selected area of the top surface of at least one first foil layer, at least one horizontal inhibition region on the at least one first foil layer that inhibits bonding between object and support regions of adjacent layers in the selected area of the at least one horizontal inhibition region, each horizontal inhibition region permitting the transmission of vertical force through the plurality of foil layers without bonding between object and support regions of adjacent layers of the plurality of foil layers in the area of the at least one horizontal inhibition region; depositing the at least one first foil layer, the at least one first foil layer comprising a first object region, a first support region connected to the first object region, and at least one horizontal inhibition region on the top surface of the at least one first foil layer; depositing at least one second foil layer, each second foil layer adjacent to a first foil layer, the second foil layer comprising a second object region and a second support region, such that at least part of the bottom surface of each second foil layer comes into contact with at least part of the top surface of the adjacent first foil layer including the at least one horizontal inhibition region; applying pressure and heat to the deposited foil layers to form an object section by bonding the first object regions and the adjacent second object regions outside the at least one horizontal inhibition region; wherein the first and second support regions are solid and configured as a mold around the object section; and after said bonding is completed, removing the support regions from the object section.

2. The method of claim 1, wherein the inhibitory material comprises carbon.

3. The method of claim 1, wherein the first support region and the second support region are configured to prevent deformation of the object section after initial deposition.

4. The method of claim 1, wherein the object section is fully enclosed by the vertical inhibition regions and the at least one horizontal inhibition region.

5. The method of claim 1, wherein the mold further comprises the vertical inhibition regions and the at least one horizontal inhibition region.

6. The method of claim 1, wherein the first support region and the second support region are configured to evenly apply temperature and pressure during the bonding process.

7. The method of claim 6, wherein the first support region and the second support region are configured to evenly distribute temperature and pressure through the first foil layer and the second foil layer.

8. The method of claim 1, further comprising aligning the second foil layer and the first foil layer by a first registration feature within the first foil layer to a second registration feature within the second foil layer.

9. The method of claim 8 wherein the first registration feature and the second registration feature comprise at least one of a hole, a slot, or a tab pattern.

10. The method of claim 1, wherein the thickness of each of the plurality of foil layers is a minimum of 100 microns and a maximum of 500 microns.

11. The method of claim 10, wherein the thickness of each of the plurality of foil layers is a minimum of 200 microns and a maximum of 500 microns.

12. The method of claim 1, wherein the first support region is connected to the first object region with a foil connection bridge configured to increase structural integrity of the first foil layer.

13. The method of claim 12, further comprising removing the foil connection bridge from the first object region.

14. The method of claim 12, further comprising forming the connection bridge in the shape of a flexure to allow the first object region and the first support region to move relative to one another.

15. The method of claim 1, further comprising: attaching the second object region to the first object region, the attached second object region and the first object region comprising the object section; and attaching the second support region to the first support region, the attached second support region and the first support region comprising a support section wherein the support section is subdivided to facilitate piecewise removal from the object section.

16. The method of claim 15, wherein the support section is subdivided with vertical inhibition prior to bonding.

17. The method of claim 16, wherein the support section is also subdivided with horizontal inhibition prior to bonding.

18. The method of claim 1, wherein the first and second support regions are solid and configured to prevent deformation of the object section after initial deposition.

19. The method of claim 18, wherein the first and second support regions have the same composition as the object section.

20. The method of claim 19, wherein the first and second support regions have the same density as the object section.

21. The method of claim 19, wherein the first and second support regions have the same stiffness as the object section.

22. A system for additive manufacturing of an object, the system comprising: an additive manufacturing device configured to: form vertical inhibition regions in a plurality of foil layers through cutting, each cut through a foil layer of the plurality of foil layers mechanically defining a boundary between a support region and an object region in the foil layer; form, through selective depositing of an inhibitory material on a selected area of the top surface of at least one first foil layer, at least one horizontal inhibition region on the at least one first foil layer that inhibits bonding between object and support regions of adjacent layers in the selected area of the at least one horizontal inhibition region, each horizontal inhibition region permitting the transmission of vertical force through the plurality of foil layers without bonding between object and support regions of adjacent layers of the plurality of foil layers in the area of the at least one horizontal inhibition region; deposit the at least one first foil layer, the at least one first foil layer comprising a first object region, a first support region connected to the first object region, and at least one horizontal inhibition region on the top surface of the at least one first foil layer; and deposit at least one second foil layer, each second foil layer adjacent to a first foil layer, the second foil layer comprising a second object region and a second support region, such that at least part of the bottom surface of each second foil layer comes into contact with at least part of the top surface of the adjacent first foil layer including the at least one horizontal inhibition region; a surface configured to apply pressure and heat to the deposited foil layers to form an object section by bonding the first object regions and the adjacent second object regions outside the at least one horizontal inhibition region; wherein the first and second support regions are solid and configured as a mold around the object section; and after said bonding is completed, using a separator to remove the support regions from the object section.

23. The system of claim 22, wherein the inhibitory material comprises carbon.

24. The system of claim 22, wherein the first support region and the second support region are configured to prevent deformation of the object section after initial deposition.

25. The system of claim 22, wherein the object section is fully enclosed by the vertical inhibition regions and the at least one horizontal inhibition region.

26. The system of claim 2, wherein the mold further comprises the vertical inhibition regions and the at least one horizontal inhibition region.

27. The system of claim 22, wherein the first support region and the second support region are configured to evenly apply temperature and pressure during the bonding process.

28. The system of claim 27, wherein the first support region and the second support region are configured to evenly distribute temperature and pressure through the first foil layer and the second foil layer.

29. The system of claim 22, wherein the first support region is connected to the first object region with a foil connection bridge configured to increase structural integrity of the first foil layer.

30. The system of claim 29, wherein the foil connection bridge is configured to be removed from the first object region.

31. The system of claim 22, further comprising an alignment mechanism configured to align the second foil layer and the first foil layer by a first registration feature within the first foil layer to a second registration feature within the second foil layer.

32. The system of claim 31, wherein the first registration feature and the second registration feature comprise at least one of a hole, a slot, or a tab pattern.

33. The system of claim 22, wherein the thickness of each of the plurality of foil layers is a minimum of 100 microns and a maximum of 500 microns.

34. The system of claim 33, wherein the thickness of each of the plurality of foil layers is a minimum of 200 microns and a maximum of 500 microns.

35. The system of claim 22, wherein the first support region is connected to the first object region with a connection bridge configured to increase structural integrity of the first foil layer.

36. The system of claim 35, wherein the connection bridge is in the shape of a flexure to allow the first object region and the first support region to move relative to one another.

37. The system of claim 35, further comprising a device configured to apply an electric current to selectively heat and melt the bridge.

38. The system of claim 22, wherein the surface is further configured to: press the second object region to the first object region, the pressed second object region and the first object region comprising the object section; and press the second support region to the first support region, the pressed second support region and the first support region comprising a support section, wherein the support section is subdivided to facilitate piecewise removal from the object section.

39. The system of claim 38, wherein the support section is subdivided with vertical inhibition prior to bonding.

40. The system of claim 39, wherein the support section is also subdivided with horizontal inhibition prior to bonding.

41. The system of claim 22, wherein the first and second support regions are solid and configured to prevent deformation of the object section after initial deposition.

42. The system of claim 41, wherein the first and second support regions have the same composition as the object section.

43. The system of claim 42, wherein the first and second support regions have the same density as the object section.

44. The system of claim 42, wherein the first and second support regions have the same stiffness as the object section.

* * * * *